(12) United States Patent
Lisseman et al.

(10) Patent No.: US 10,179,541 B2
(45) Date of Patent: *Jan. 15, 2019

(54) STEERING WHEEL LIGHT BAR

(71) Applicant: TK Holdings Inc., Auburn Hills, MI (US)

(72) Inventors: Jason Carl Lisseman, Shelby Township, MI (US); Valerie Dawn Gardner, St. Clair Township, MI (US); Dwayne Van'tZelfde, Holly, MI (US); Erick Paul Staszak, Rochester Hills, MI (US); Norbert Hubert Mueller, Aschaffenburg (DE); David William Andrews, Ortonville, MI (US)

(73) Assignee: JOYSON SAFETY SYSTEMS ACQUISITION LLC, Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/728,193

(22) Filed: Oct. 9, 2017

(65) Prior Publication Data

US 2018/0126900 A1    May 10, 2018

Related U.S. Application Data

(63) Continuation of application No. 15/075,527, filed on Mar. 21, 2016, now Pat. No. 9,815,406, which is a
(Continued)

(51) Int. Cl.
*B60Q 9/00* (2006.01)
*B62D 1/06* (2006.01)
*B60Q 3/283* (2017.01)

(52) U.S. Cl.
CPC .............. *B60Q 9/00* (2013.01); *B60Q 3/283* (2017.02); *B62D 1/06* (2013.01)

(58) Field of Classification Search
CPC .......... B60R 21/203; B60J 15/029; B60J 1/04
(Continued)

(56) References Cited

U.S. PATENT DOCUMENTS 2,825,567 A   3/1958  Simons et al.
3,485,974 A   12/1969 Wolf et al.
(Continued)

FOREIGN PATENT DOCUMENTS

CN    101639181    2/2010
CN    201487849    5/2010
(Continued)

OTHER PUBLICATIONS

Final Office Action, dated Aug. 25, 2015, received in connection with U.S. Appl. No. 14/061,383.
(Continued)

*Primary Examiner* — Toan N Pham
(74) *Attorney, Agent, or Firm* — Meunier Carlin & Curfman LLC

(57) ABSTRACT

The present invention is directed to a steering apparatus for a vehicle having a including a light element providing indication and warning light signals to the user of the vehicle. The light element can be associated with a PCB mounted to the steering wheel grip for controlling the operation of the light element. The PCB may be thermally coupled to a heat exchange component such that heat from the light element is transferred from the PCB to the steering wheel grip.

20 Claims, 14 Drawing Sheets

Related U.S. Application Data continuation of application No. 14/061,408, filed on Oct. 23, 2013, now Pat. No. 9,308,857.

(60) Provisional application No. 61/717,546, filed on Oct. 23, 2012.

(58) Field of Classification Search
USPC .......... 340/435, 438, 441; 74/552, 558; 362/487, 488
See application file for complete search history.

(56) References Cited

U.S. PATENT DOCUMENTS

| | | | |
|---|---|---|---|
| 4,664,127 A | 5/1987 | Ikeyama | |
| 4,835,512 A | 5/1989 | Bratton | |
| 4,993,281 A | 2/1991 | Miller | |
| 5,203,226 A | 4/1993 | Hongou et al. | |
| D342,474 S | 12/1993 | Oki | |
| D342,925 S | 1/1994 | Brajcki | |
| 5,333,102 A | 7/1994 | Oberman et al. | |
| 5,516,143 A | 5/1996 | Lang et al. | |
| 5,558,364 A | 9/1996 | Davis | |
| 5,661,839 A | 8/1997 | Whitehead | |
| 5,666,102 A | 9/1997 | Lahiff | |
| 5,855,144 A | 1/1999 | Martin | |
| 5,895,115 A | 4/1999 | Parker et al. | |
| D418,786 S | 1/2000 | Giamos | |
| 6,190,026 B1 | 2/2001 | Moore | |
| 6,296,380 B1 | 10/2001 | Dawli | |
| 6,538,405 B1 | 3/2003 | Brzozowski et al. | |
| D475,064 S | 5/2003 | Nashida et al. | |
| 6,651,526 B1 | 11/2003 | Imaizumi et al. | |
| 6,668,682 B1 | 12/2003 | Emeneth et al. | |
| 6,703,999 B1 | 3/2004 | Iwanami | |
| 6,768,067 B2 | 7/2004 | Adachi et al. | |
| 6,817,100 B2 | 11/2004 | Mori et al. | |
| 7,143,663 B2 | 12/2006 | Menaldo et al. | |
| 7,173,536 B2 | 2/2007 | Duval | |
| D556,768 S | 12/2007 | Morris | |
| D556,769 S | 12/2007 | Morris | |
| 7,377,186 B2 | 5/2008 | Duval | |
| 7,414,520 B2 | 8/2008 | Meiβner | |
| 7,468,656 B1 | 12/2008 | Frank | |
| 7,525,449 B1 | 4/2009 | Lafontaine | |
| 7,602,278 B2 | 10/2009 | Prost-Fin et al. | |
| 7,605,693 B2 | 10/2009 | Kulas | |
| 7,605,694 B2 | 10/2009 | Prost-Fin et al. | |
| D607,005 S | 12/2009 | Ording et al. | |
| 7,672,759 B1 | 3/2010 | Lafontaine | |
| 7,679,495 B2 | 3/2010 | Beutnagel-Buchner et al. | |
| 7,680,574 B2 | 3/2010 | Berg et al. | |
| 7,710,279 B1 | 5/2010 | Fields et al. | |
| 7,786,886 B2 | 8/2010 | Maruyama et al. | |
| 7,969,531 B1 | 6/2011 | Li et al. | |
| 7,987,030 B2 | 7/2011 | Flores et al. | |
| D643,438 S | 8/2011 | Gardner et al. | |
| 7,997,612 B2 | 8/2011 | Gulde | |
| 8,061,861 B2 | 11/2011 | Paxton et al. | |
| 8,067,709 B2 | 11/2011 | Han et al. | |
| 8,136,425 B2 | 3/2012 | Bostick | |
| 8,198,996 B2 | 6/2012 | Golomb et al. | |
| 8,210,564 B2 | 7/2012 | Helmstetter et al. | |
| 8,264,622 B2 | 9/2012 | Gourlay | |
| 8,269,452 B2 | 9/2012 | Watanabe | |
| D698,819 S | 2/2014 | Gardner et al. | |
| D699,251 S | 2/2014 | Rao et al. | |
| 8,645,001 B2 | 2/2014 | Basson et al. | |
| 8,761,565 B1 | 6/2014 | Coleman et al. | |
| D738,900 S | 9/2015 | Drozd et al. | |
| 9,134,729 B1 | 9/2015 | Szybalski et al. | |
| 9,159,221 B1 | 10/2015 | Stantchev | |
| 9,223,638 B2 | 12/2015 | Hudzia et al. | |
| D752,632 S | 3/2016 | Seo et al. | |
| 9,308,856 B2 | 4/2016 | Lisseman et al. | |
| 9,308,857 B2 | 4/2016 | Lisseman et al. | |
| D766,305 S | 9/2016 | Mochizuki et al. | |
| D771,072 S | 11/2016 | Protzman et al. | |
| D778,313 S | 2/2017 | Cho | |
| D785,003 S | 4/2017 | Yun et al. | |
| D786,304 S | 5/2017 | Cronin et al. | |
| D787,547 S | 5/2017 | Basargin et al. | |
| 9,873,446 B2 * | 1/2018 | Gardner ............... | B62D 1/046 |
| 2002/0068605 A1 | 6/2002 | Stanley | |
| 2003/0121360 A1 | 7/2003 | Hussy | |
| 2004/0030807 A1 | 2/2004 | Wessler et al. | |
| 2004/0045396 A1 | 3/2004 | Hosokawa et al. | |
| 2004/0143379 A1 | 7/2004 | Borroni-Bird et al. | |
| 2004/0267422 A1 | 12/2004 | Bossler et al. | |
| 2005/0021190 A1 | 1/2005 | Worrell et al. | |
| 2005/0021990 A1 | 1/2005 | Liardet et al. | |
| 2005/0189159 A1 | 9/2005 | Weber et al. | |
| 2006/0070795 A1 | 4/2006 | Meissner | |
| 2006/0236807 A1 | 10/2006 | Yasuda et al. | |
| 2006/0241818 A1 | 10/2006 | Kumon et al. | |
| 2007/0010944 A1 | 1/2007 | Ferrebee et al. | |
| 2007/0173983 A1 | 7/2007 | Takahashi et al. | |
| 2007/0260375 A1 | 11/2007 | Hilton et al. | |
| 2007/0290375 A1 | 12/2007 | Huang | |
| 2008/0023253 A1 | 1/2008 | Prost-Fin et al. | |
| 2008/0023254 A1 | 1/2008 | Prost-Fin et al. | |
| 2008/0061954 A1 | 3/2008 | Kulas | |
| 2008/0080741 A1 | 4/2008 | Yokoo et al. | |
| 2008/0202281 A1 | 8/2008 | Bruyere et al. | |
| 2008/0202282 A1 | 8/2008 | Bassett et al. | |
| 2009/0002586 A1 | 1/2009 | Kimura | |
| 2009/0063053 A1 | 3/2009 | Basson et al. | |
| 2009/0096937 A1 | 4/2009 | Bauer | |
| 2009/0189373 A1 | 7/2009 | Schramm et al. | |
| 2009/0223321 A1 | 9/2009 | Stefani | |
| 2009/0319095 A1 | 12/2009 | Cech et al. | |
| 2010/0107806 A1 * | 5/2010 | Corinaldi ............... | B62D 1/046 74/552 |
| 2010/0194080 A1 | 8/2010 | Paxton et al. | |
| 2010/0201896 A1 | 8/2010 | Ostreko et al. | |
| 2010/0218641 A1 | 9/2010 | Neumann et al. | |
| 2010/0295670 A1 | 11/2010 | Sato et al. | |
| 2011/0153160 A1 | 6/2011 | Hesseling et al. | |
| 2011/0187518 A1 | 8/2011 | Strumolo et al. | |
| 2011/0194047 A1 | 8/2011 | Bruyneel | |
| 2011/0198201 A1 | 8/2011 | Chuang | |
| 2011/0198999 A1 | 8/2011 | Honma et al. | |
| 2011/0310331 A1 | 12/2011 | Heo et al. | |
| 2011/0317120 A1 | 12/2011 | Kajiya et al. | |
| 2012/0013490 A1 | 1/2012 | Pance | |
| 2012/0146776 A1 | 6/2012 | Eguchi | |
| 2012/0150387 A1 | 6/2012 | Waston | |
| 2012/0267222 A1 | 10/2012 | Gohng et al. | |
| 2013/0082874 A1 | 4/2013 | Zhang et al. | |
| 2013/0128190 A1 | 5/2013 | Huang | |
| 2013/0152721 A1 | 6/2013 | Trendov et al. | |
| 2013/0245886 A1 | 9/2013 | Fung et al. | |
| 2014/0081521 A1 | 3/2014 | Fröjdh et al. | |
| 2014/0098558 A1 | 4/2014 | Vasylyev | |
| 2014/0109719 A1 | 4/2014 | Lisseman et al. | |
| 2014/0111324 A1 | 4/2014 | Lisseman et al. | |
| 2014/0111325 A1 | 4/2014 | Lisseman et al. | |
| 2014/0111736 A1 | 4/2014 | An et al. | |
| 2014/0232538 A1 | 8/2014 | Sobue et al. | |
| 2014/0240114 A1 | 8/2014 | Waeller et al. | |
| 2014/0244115 A1 | 8/2014 | Sanma et al. | |
| 2014/0301097 A1 | 10/2014 | Neumann et al. | |
| 2014/0375785 A1 | 12/2014 | Kogut | |
| 2015/0062490 A1 | 3/2015 | Kwon | |
| 2015/0212705 A1 | 7/2015 | Sasaki et al. | |
| 2015/0251600 A1 | 9/2015 | Mochizuki et al. | |
| 2015/0253922 A1 | 9/2015 | Goodlein | |
| 2015/0375677 A1 | 12/2015 | Salter et al. | |
| 2016/0191859 A1 | 6/2016 | Lisseman | |
| 2016/0200246 A1 | 7/2016 | Lisseman et al. | |
| 2016/0200343 A1 | 7/2016 | Lisseman et al. | |
| 2016/0257248 A1 | 9/2016 | Lisseman et al. | |
| 2016/0311366 A1 | 10/2016 | Lisseman | |
| 2016/0334876 A1 | 11/2016 | Park | |
| 2017/0166125 A1 | 7/2017 | Lisseman et al. | |

(56) References Cited

U.S. PATENT DOCUMENTS

FOREIGN PATENT DOCUMENTS

| CN | 102066181 | 5/2011 |
|---|---|---|
| CN | 201998981 | 10/2011 |
| CN | 202371573 | 8/2012 |
| DE | 20018732 | 2/2001 |
| DE | 20014731 | 2/2002 |
| DE | 10113493 | 9/2002 |
| DE | 102005013202 | 9/2006 |
| EP | 0801373 | 10/1997 |
| FR | 2744976 | 8/1997 |
| JP | 10-059190 | 3/1998 |
| JP | 2000-153769 | 6/2000 |
| JP | 2001055149 | 2/2001 |
| JP | 2005/088792 | 4/2005 |
| JP | 2004-148911 | 5/2007 |
| JP | 2007-114379 | 5/2007 |
| JP | 2007153048 | 6/2007 |
| JP | 2009/018722 | 1/2009 |
| JP | 2010-017007 | 1/2010 |
| JP | 2010-241275 | 10/2010 |
| JP | 2012-093584 | 5/2012 |
| JP | 2012-129742 | 7/2012 |
| WO | 1998/03365 | 1/1998 |
| WO | 2002/096745 | 12/2002 |
| WO | 2005/025936 | 3/2005 |
| WO | 2006/076903 | 7/2006 |
| WO | 2006/127835 | 11/2006 |
| WO | 2009/026223 | 2/2009 |
| WO | 2009/111098 | 9/2009 |
| WO | 2010/051090 | 5/2010 |
| WO | 2010/087931 | 8/2010 |
| WO | 2010131305 | 11/2012 |
| WO | 2014/066476 | 5/2014 |
| WO | 2014/066477 | 5/2014 |
| WO | 2014/066512 | 5/2014 |

OTHER PUBLICATIONS

Non-final Office Action, dated Feb. 18, 2015, received in connection with U.S. Appl. No. 14/061,383.
Non-final Office Action, dated Mar. 13, 2015, received in connection with U.S. Appl. No. 14/061,397.
Final Office Action, dated Aug. 25, 2015, received in connection with U.S. Appl. No. 14/061,408.
Non-final Office Action, dated Feb. 18, 2015, received in connection with U.S. Appl. No. 14/061,408.
International Preliminary Report on Patentability, dated Apr. 28, 2015, received in connection with International Patent Application No. PCT/US2013/066329.
International Search Report and Written Opinion dated Feb. 7, 2014, received in connection with International Patent Application No. PCT/US2013/066329.
International Search Report and Written Opinion, dated Feb. 7, 2014, received in connection with International Patent Application No. PCT/US2013/066399.
International Preliminary Report on Patentability, dated Apr. 28, 2015, received in connection with International Patent Application No. PCT/US2013/066330.
International Search Report and Written Opinion dated Feb. 7, 2014, received in connection with International Patent Application No. PCT/US2013/066330.
Co-pending U.S. Appl. No. 15/075,519, filed Mar. 21, 2016.
Office Action issued in Japanese Application No. JP2015-538159, dated Aug. 29, 2017.
Office Action issued in Japanese Application No. JP2015-538153, dated Aug. 29, 2017.
Office Action issued in Japanese Application No. JP2015-538152, dated Aug. 29, 2017.
Third Office Action issued in Chinese Application No. 201380055394.4, dated Sep. 9, 2017.
Second Office Action issued in Chinese Application No. 201380055391.0, dated Apr. 19, 2017.
Non-Final Office Action issued in U.S. Appl. No. 14/806,325, dated May 11, 2017.
Office Action in U.S. Appl. No. 14/307,780, dated Mar. 28, 2017.
Office Action in U.S. Appl. No. 14/307,780, dated Oct. 28, 2016.
Office Action in U.S. Appl. No. 15/075,519, dated Sep. 20, 2016.
International Search Report and Written Opinion conducted in International Application No. PCT/US2016/29218, dated Aug. 5, 2016.
Office Action issued in counterpart Japanese Application No. 2010-523275 dated Jun. 5, 2012 (2 pages) and an English translation of the same (1 page).
English translation of the International Preliminary Report on Patentability (Chapter I or Chapter II of the Patent Cooperation Treaty) from the International Bureau of WIPO for International Application No. PCT/DE2008/001527 dated Apr. 7, 2010, 17 pages.
PCT/US2013/066329, filed Oct. 23, 2013, International Search Report and Written Opinion dated Feb. 7, 2014.
PCT/US2013/066399, filed Oct. 23, 2013, International Search Report and Written Opinion dated Feb. 7, 2014.
Non final office action for U.S. Appl. No. 14/061,383 dated Feb. 18, 2015.
Office Action issued in Chinese Application No. 201380055405.9, dated Jun. 2, 2016.
Office Action issued in Chinese Application No. 201380055394.4, dated Jun. 28, 2016.
Office Action issued in Chinese Application No. 201380055391.0, dated Jul. 29, 2016.
International Preliminary Report on Patentability, dated Nov. 2, 2017, received in connection with International Patent Application No. PCT/US2016/029218.
Office Action in U.S. Appl. No. 15/137,646, dated Oct. 27, 2017.
Office Action in U.S. Appl. No. 15/443,354, dated Oct. 10, 2017.
Office Action issued in U.S. Appl. No. 15/075,527, dated Feb. 13, 2017.
Fourth Office Action in CN Application No. 201380055394.4, dated May 11, 2018.
Office Action issued in U.S. Appl. No. 14/635,547, dated Feb. 26, 2016.
Notice of Allowance in U.S. Appl. No. 14/635,547, dated Oct. 14, 2016.
English translation of Second Office Action dated Nov. 28, 2016, from Chinese application 201380055405.9.
Second Office Action issued in Chinese Application No. 201380055394.4, dated Feb. 28, 2017.
International Search Report and Written Opinion in PCT/US2018/012387, dated May 9, 2018.
"NaviGadget", CSW Steering Wheel Wth Driving Instruction, NaviGadget [online], published Apr. 8, 2008, [retrieved Oct. 24, 2016], retrieved from the Internet <URL:http://www.navigadget.com/index.php/2008/04/08/csw-steering-wheel-with-driving-instructions>.
Video: BMW M Performance Steering Wheel with Digital Race Display in Action, bimmerpost.com [on line], published Nov. 3, 2012, [retrieved Aug. 12, 2017], retrieved from the internet <URL:http://www.bimmerpost.com/tag/bmw-m-performance-steering-wheeldigital-display/>.
Office Action issued for Chinese Application No. 201580039946.1, dated Jul. 30, 2018.

\* cited by examiner

STEERING WHEEL LIGHT BAR

RELATED APPLICATION

This application is a continuation application of U.S. patent application Ser. No. 15/075,527, filed Mar. 21, 2016, now U.S. Pat. No. 9,815,406, which claims the benefit of U.S. patent application Ser. No. 14/061,408, filed Oct. 23, 2013, now U.S. Pat. No. 9,308,857, entitled "Steering Wheel Light Bar," which claims priority to U.S. Patent Application No. 61/717,546, filed Oct. 23, 2012, entitled "Steering Wheel Light Bar," the contents of which are incorporated herein by reference.

TECHNICAL FIELD

This invention generally relates to a steering apparatus including a light element. More specifically, the invention relates to a vehicle steering wheel including a light element providing indication and warning signals to the user.

BACKGROUND

Various advanced driver assistance systems incorporate visual, acoustic and/or sensor warnings. Visual interfaces for these assistance systems must minimize both driver reaction time to warnings and the workload on the driver to comprehend and respond to the warning or information. Conventional instrument panel and center-stack displays require the driver's attention be drawn away from navigating the vehicle. Similarly, idealized heads up displays can be jarring and sometimes distracting to the driver. Therefore, a need in the art exists for a driver assistance system that utilizes the driver's peripheral vision and allows the driver to keep both hands on the wheel while maintaining focus in their direct line of sight. In doing so, drivers can gain valuable and important reaction time in critical driving situations.

SUMMARY

Presented are systems and methods for providing a light element in a steering apparatus. An aspect of the present disclosure is directed to a method of illuminating a light element mounted to a steering grip of a steering apparatus. The method may include receiving, from a processor, instructions for controlling operation of a light element. The method may further include varying an illumination characteristic of the light element in response to the instructions.

The details of one or more implementations of the invention are set forth in the accompanying drawings and the description below. Other features, objects, and advantages of the invention will be apparent from the description and drawings, and from the claims.

DESCRIPTION OF DRAWINGS

The device is explained in even greater detail in the following exemplary drawings. The drawings are merely exemplary to illustrate the structure of preferred devices and certain features that may be used singularly or in combination with other features. The invention should not be limited to the implementations shown.

DETAILED DESCRIPTION

Figure 1:
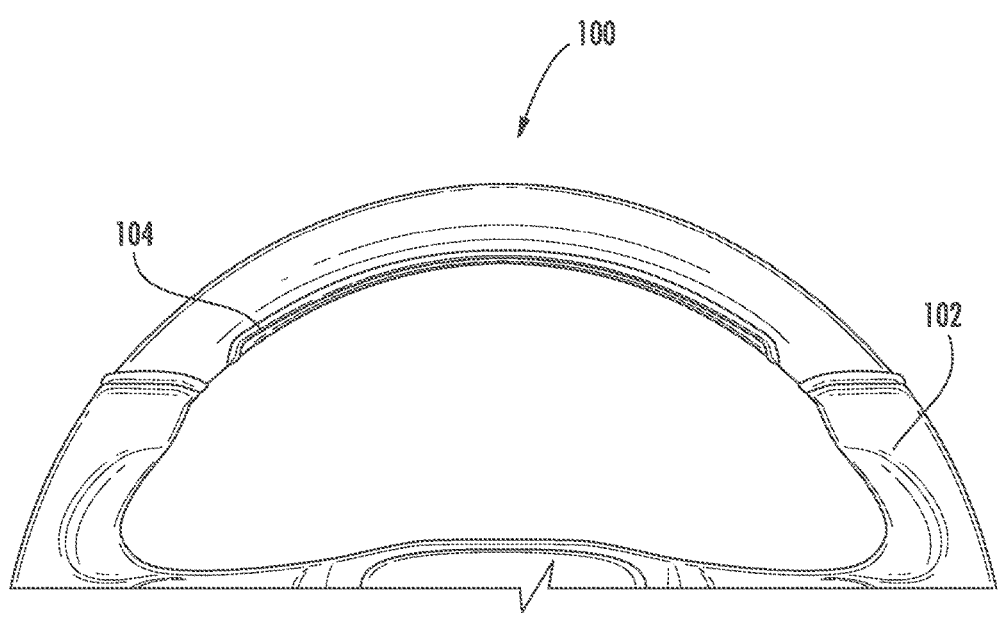
FIG. 1 is a partial view of an exemplary steering apparatus.

Certain exemplary implementations of the invention will now be described with reference to the drawings. In general, such implementations relate to a steering apparatus for a vehicle. FIG. 1 is a partial plan view of an exemplary steering apparatus 100 having a steering grip 102. The steering grip 102 can be configured for gripping to facilitate control of the vehicle. For example, the steering grip 102 may be mounted on a fixed component (not shown) such that it is rotationally movable about a steering axis. An exemplary fixed component can include, for example, a steering column, which receives a steering spindle that extends along the steering axis and serves to transmit the rotational movement of the steering grip 102 to the wheels of the motor vehicle. Rotational movement of the steering grip 102 may be transmitted to the wheels by mechanical and/or electrical means. In an exemplary implementation, the steering grip 102 can include a single continuous grip portion or any number of unique grip sections. For example, the steering grip 102 can include an annular ring shape with an outer contour that is essentially circular in shape. In an alternate implementation, the steering grip 102 can define any suitable shape including, for example, circular, elliptical, square, rectangular, or any other regular or irregular shape.

In an exemplary implementation, the steering apparatus 100 also includes a light element 104 for providing indication and/or warning light signals to the driver of the vehicle. The light element 104 can include, for example, a liquid crystal display (LCD), thin-film-transistor display, active-matrix display, a segmented display (e.g., improved black nematic (INB), super twisted nematic (STN), etc.), a light-emitting diode (LED), a liquid crystal display, laser, halogen, fluorescent, an infra-red (IR) LED illuminator, or any other suitable light emitting element. In an alternate implementation, the light element can include a light pipe (not shown) having a start and end LEDs located at opposite ends of a (solid or hollow) molded plastic rod. The steering apparatus 100 can also include a reflective material or surface for recycling light emitted from the light element 104 and can be used to direct light to the driver. In an exemplary implementation, when the light element 104 comprises an IR LED illuminator, illumination of the IR LED may also provide a desirable heat effect to the steering grip 102 and may direct heat towards the driver's hands. For example, a steering grip 102 may include a heat element, usually a heater mesh, used to provide a heat effect on the steering grip 102. The heat mesh may be wrapped around the steering grip 102 and/or incorporated into the grip cover material. In an example steering apparatus 100, the heat mesh does not cover over the portion of the steering grip 102 including the light element 104 thereby resulting in a gap in the heat effect. IR LEDs may be used as the light element 104 to provide the heat effect in the area of the light element 104, thereby providing a full heat effect at the surface of the steering grip 102. In another example steering apparatus 100, the heat mesh covers, partially or entirely, the portion of the steering grip 102 including the light element 104, thereby reducing and/or eliminating any gap in the heat effect.

Figure 2:
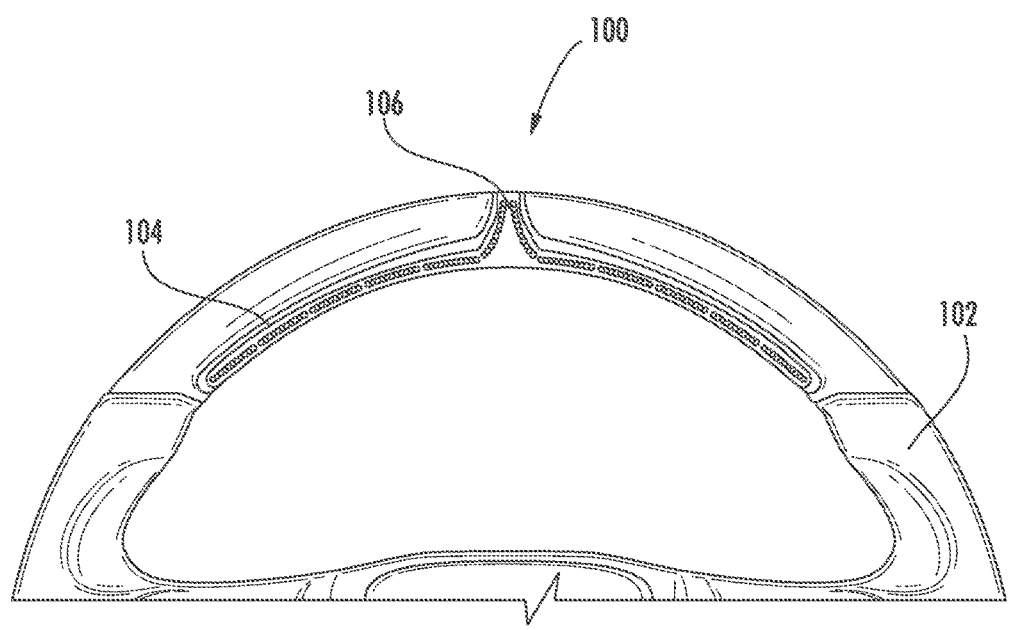
FIG. 2 is a partial view of an exemplary steering apparatus.

In an exemplary implementation, the light element 104 can display a single color or multiple colors. For example, the exemplary LED can include a single color LED, a bi-color LED, and a tri-color LED. The steering apparatus 100 can include a single light element 104 or any number of light elements 104. Moreover, different types of light elements 104 may be implemented on the same steering apparatus 100. For example, a steering grip 102 may include both standard LEDs and IR LEDs. The light element 104 can be located at any portion of the steering grip 102. For example, as illustrated in FIG. 1, the light element 104 can be located on an interior edge of the steering grip 102. In an alternate implementation, not shown, the light element 104 can be located on an exterior edge of the steering grip 102. In an alternate implementation (not shown), the light element 104 can be located on a front or back face of the steering grip 102. The light element 104 can be provided in a direction defined by the perimeter/diameter of the steering grip 102. For example, as illustrated in FIG. 1, the light element 104 can extend along the direction of the upper half of the steering grip 102 on the inner diameter of the steering grip 102. The light element can define any suitable shape including, for example, circular, elliptical, square, rectangular, or any other regular or irregular shape. For example, as illustrated in FIG. 1, the exemplary light element 104 is provided with an elongated shape having curvilinear sides. In an alternate implementation provided in FIG. 2, the light element 104 can include a vertical element 106 extending in a radial direction of the steering grip 102.

Figure 3C:
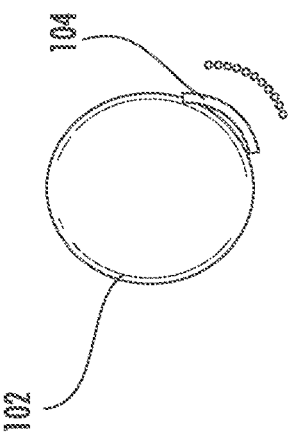
FIG. 3C is a schematic partial cross-section view of an exemplary steering grip and light element.
Figure 3B:
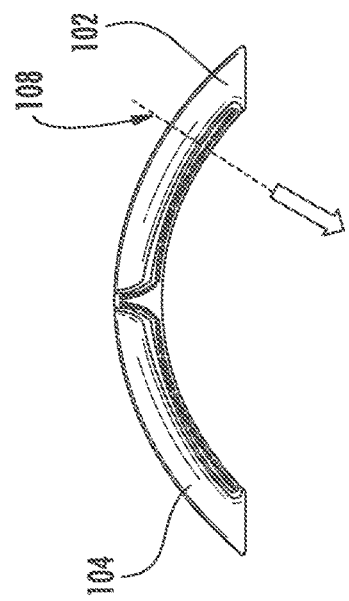
FIG. 3B is a partial view of a top section of an exemplary steering grip.
Figure 3A:
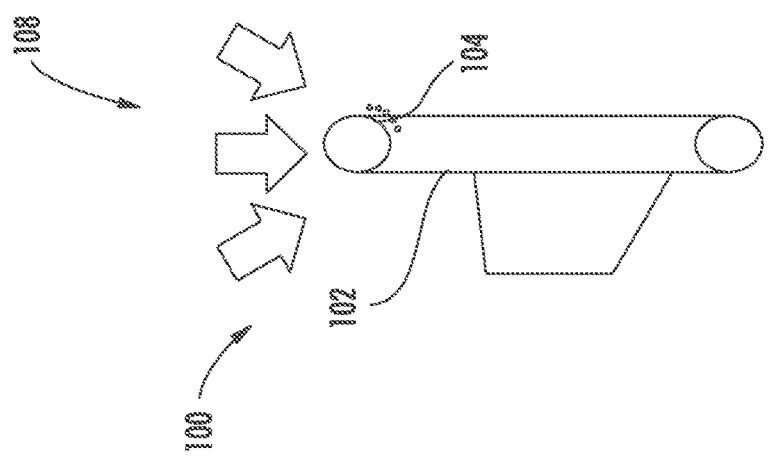
FIG. 3A is a schematic cross-section view of an exemplary steering grip.

FIG. 3A provides a schematic side cross-section view of an exemplary steering grip 102. As illustrated in FIG. 3A, the exemplary steering grip 102 includes a light element 104 positioned on the inner diameter of the steering grip 102. In particular, FIG. 3A illustrates that the body of the steering grip 102 and the light element 104 can be sized and configured such that the body of the steering grip 102 shields the light element from ambient light 108. For example, as provided in FIGS. 3B and 3C, the light element 104 is shielded from ambient light 108 directed at the upper portion/top side of the steering grip 102. Because the light element 104 is shielded from ambient light 108, a lower intensity light signal may be used. In an exemplary implementation, a daylight warning intensity of the light element 104 may be about 150 to about 800 nit. In a particular implementation, the daylight intensity of the light element 104 may be about 150 to about 500 nit. In another implementation, the daylight intensity of the light element 104 may be about 150 to about 250 nit. In another example, the daylight intensity of the light element 104 may be at least about 250 nit. In another example, the daylight intensity of the light element 104 may be at least about 150 nit. In a further exemplary implementation, because there is less ambient light at nighttime and because the light element 104 is shielding from the existing ambient light 108, the nighttime warning intensity of the light element 104 may be at least about 5 to about 50 nit. In another example, the nighttime warning intensity of the light element 104 may be at least about 5 to about 25 nit. In another example, the nighttime warning intensity of the light element 104 may be at least about 5 to about 15 nit. In another example, the nighttime warning intensity of the light element 104 may be at least about 5 to about 10 nit. In another example, the nighttime warning intensity of the light element 104 may be at least about 5 nit.

Figure 4:
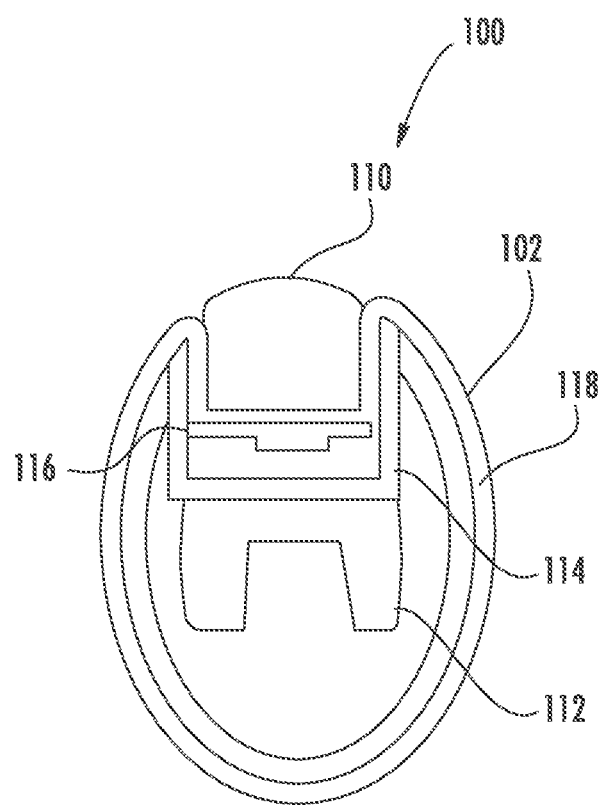
FIG. 4 is a schematic partial cross-section view of an exemplary steering grip and light element.

In an exemplary implementation, a lens 110 is configured to cover the light element 104. The lens 110 may be sized and shaped to correspond to the size and shape of the light element 104. As illustrated in FIG. 4, the outer surface of the lens 110 may be adjacent to the exterior surface of the steering grip 102. For example, the lens 110 may provide a surface that is congruent with the exterior surface of the steering grip 102. In an alternate implementation (not shown), the lens 110 may provide an outer surface that has a different general shape than the profile defined by the steering grip 102. The outer lens 110 may comprise a fully or partially transparent, translucent, or opaque body. The outer lens 110 can be constructed from a hard or soft material. The outer lens 110 can include a surface feature or texture to provide a grip or "feel" to the driver. The outer lens 110 can be constructed from a single layer of material or multiple layers of material. The outer lens 110 may filter, direct, or otherwise modify the properties of the light signals emitted from the light element 104. In an exemplary implementation, the lens 110 is configured to shield the light element 104 from ambient light.

As illustrated in FIG. 4, the steering grip 102 also includes a frame 112 providing the support structure for the steering grip 102, a carrier 114 mounted to the frame 112 and configured to engage a PCB 116 and/or control circuitry for supporting and controlling operation of the light element 104. The carrier 114 may be sized and shaped to facilitate attachment to various frame 112, PCB 116, and outer lens 110 structures. The carrier 114 can be mounted to the frame 112 using screws, hooks, clips, or any other form of mechanical fastener known in the art. An exemplary carrier 114 may be joined with the frame 112 using a thermally conductive "gap pad" or other thermally conductive adhesive. The frame 112 may also define the support structure for central hub and spokes of the steering grip 103. In an alternate implementation (not shown), the carrier 114 is not required and the PCB 116 and/or control circuitry is coupled to the frame 112 of the steering grip 102. As illustrated in FIG. 4, an exemplary steering grip 102 includes a covering 118 configured to cover the exterior of the steering grip 102 body and provide a surface for the driver to handle during operation of the vehicle. In an exemplary implementation, the covering 118 may also, partially or fully, cover the lens 110 without severely impacting light transmission to the driver. It is contemplated, that, when covering the lens 110, the covering 118 conceals the lens 110 and light element 104 when not illuminated. Exemplary covering 118 materials include, for example, leather, cloth, polyurethane foam, and various other synthetic materials.

Figure 5A:
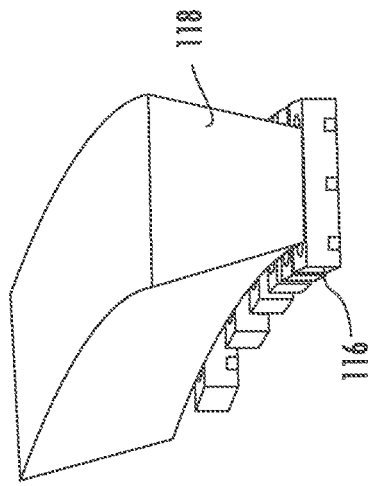
FIG. 5A is a partial cross-section view of an exemplary light element.
Figure 5B:
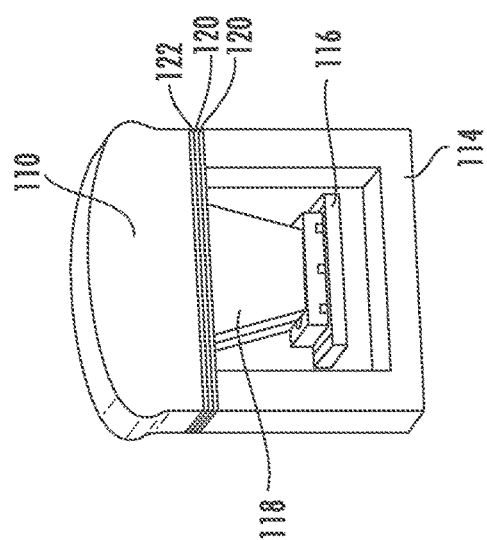
FIG. 5B is a partial cross-section view of an exemplary light element.
Figure 5C:
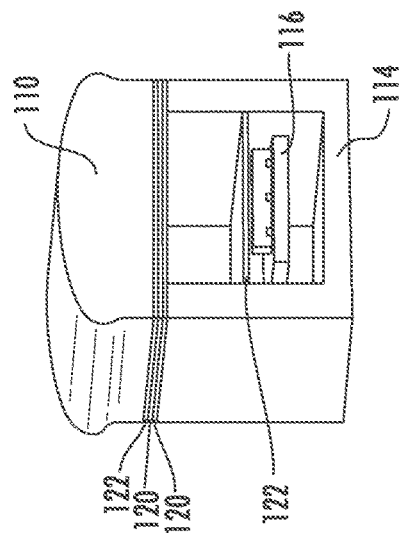
FIG. 5C is a partial cross-section view of an exemplary light element.

In an exemplary implementation, to reduce energy consumption and heat generation, the light emitted from the light element 104 is filtered and guided to maximize the light signal directed through the outer lens 110. In an exemplary implementation, light emitted from the light element 104 is recycled using a solid acrylic lens 118. The lens 118 may be trapezoidal in shape such that light is reflected in the desired direction (i.e., at the driver). In an exemplary implementation, reflective surfaces of the carrier 114 are painted white or other highly reflective color to ensure that light is reflected in the desired direction and not refracted internal to the system. Fillers and fibers can be added to the outer lens 110 and/or the lens 118 to direct light toward the driver and to increase the brightness of the light output the outer lens 110. In a further implementation, brightness enhancing films 120 can be used to direct light to the driver. The exemplary brightness enhancing films 120 may be used individually or multiple films may be stacked together. As illustrated in FIG. 5B, multiple brightness enhancing films 120 may be stacked adjacent to the lens 118. In a further implementation, diffusing films 122 and/or textured lens surfaces may be used where high light intensity is not needed. As illustrated in FIG. 5B, diffusing films may be located adjacent to the brightness enhancing films 120. In an alternate implementation, a diffusing film 122 may be located adjacent to the LED 116. Light passes through the diffusing films 122 and into the brightness enhancing films 120. Another diffusing film 122 may be located adjacent to the brightness enhancing films 120 and the lens 110. By securing a tight coupling between the light element 104 to the outer lens 110, the brightness of the output light is increased. Any order or combination of brightness enhancing films 120, diffusing films 122, and lenses 118/110 are contemplated. In an exemplary implementation, the brightness enhancing films 120 and diffusing films 122 may be stacked and oriented in such a way that the ambient light entering the lens 110 cannot pass through the lens 110. Blocking the ambient light allows the lens 110 to have a higher transmission rate while preventing internal components of the light assembly and steering grip 102 from being seen by the driver on from the outside.

The light element 104 can be associated with circuitry for controlling operation of the light signal provided by the light element 104. In an exemplary implementation, the light element 104 may be wired directly to control circuitry of the steering apparatus 100. For example, the light element 104 may include a T-type LED that can be wired through an inline resistor to a steering apparatus 100 power source. In an alternate implementation, the light element 104 can be associated with a PCB (not shown) or processor mounted to or associated with the electronic control unit of the vehicle. The PCB/processor can be configured to provide operation instructions from the vehicle to the light element 104. In a further implementation, the light element 104 may be associated with a PCB 116 configured to provide operation instructions to the light element 104. For example, as illustrated in FIG. 4, the light element 104 can by physically mounted to the surface of the PCB 116. The PCB 116 can include, for example, rigid, semi-rigid, and flexible-type PCBs 116. An example PCB 116 can include a flex circuit wherein the LEDs 116 are mounted to backing material that acts as a heat sink. The backing material can include, for example, an aluminum flex backing. Other types and combinations of PCBs are contemplated.

In an exemplary implementation, the PCB 116 can be mounted to the steering grip 102. For example, as illustrated in FIG. 4, the PCB 116 and/or control circuitry is mounted to the frame 112 of the steering grip 102 via carrier 114. In an alternate implementation (not shown), the PCB 116 and/control circuitry is mounted directly to the frame 112 of the steering grip 102. The board material of an exemplary PCB 116 may be constructed of FR-4 (G-10) glass reinforced epoxy laminate. Because FR-4 has a poor thermal conductivity (approximately 0.003 W/cm·C°), and because the frame 112 may be constructed of materials having high thermal conductivity including, for example, magnesium alloy (diecast) (1.575 W/cm·C°), aluminum alloy (diecast) (2.165 W/cm·C°), and steel (low carbon) (0.669 W/cm·C°), it is desirable to thermally couple the PCB 116 to the frame 112 in order to dissipate heat way from the light elements 104. In an exemplary implementation, the PCB 116 can be thermally coupled to a heat exchange component associated with the steering grip 102. The heat exchange component can be configured to transfer heat from the PCB 116 to the steering grip 102. The heat exchange component may comprise, for example, a thermally conductive resin, an epoxy, a polymer, and/or a metal. In an exemplary implementation, the steering grip 102 may be coupled to the central hub and spokes such that heat from the light element 104 can be transferred from the steering grip 102 to the spokes and central hub of the steering grip 102.

In a high intensity environment (5 nit or greater), in order to ensure driver comfort in handling the steering grip 102 and to prolong life of the light element 104 (in hours of illumination), the exemplary heat exchange component must dissipate heat from the light elements 104 at a rate sufficient to ensure that the surface temperature of the steering grip 102 does not exceed, approximately, 45° C. In an alternate implementation where only low intensity light elements 104 are used, the steering apparatus 100 may not include a heat exchange component. For example, in a system where the light element 104 generate a light at an intensity up to only 5 nit, the heat output by the light elements 104 will be not necessitate the use of a heat exchange component for dissipating heat from the light source 104.

Figure 6A:
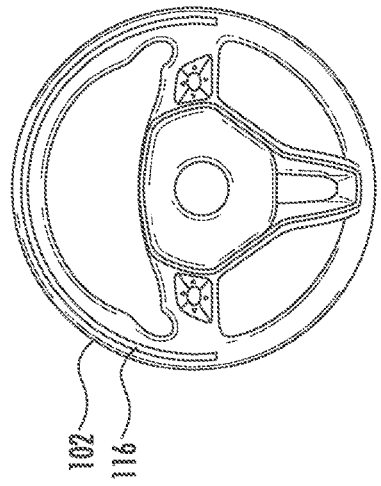
FIG. 6A is a plan view of an exemplary steering grip.
Figure 6B:
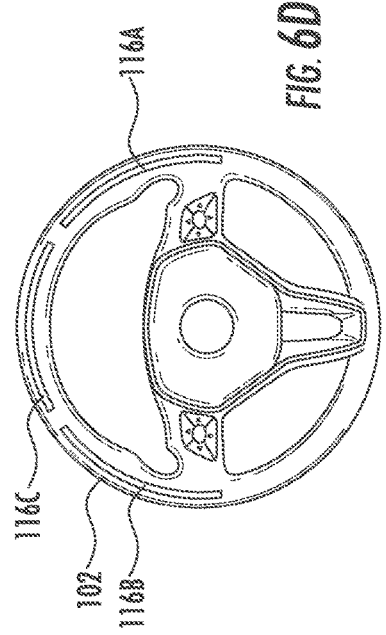
FIG. 6B is a plan view of an exemplary steering grip.
Figure 6C:
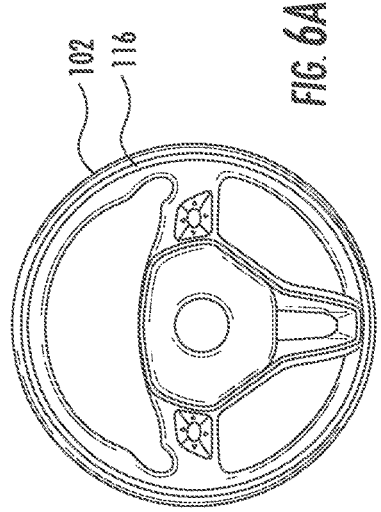
FIG. 6C is a plan view of an exemplary steering grip.
Figure 6D:
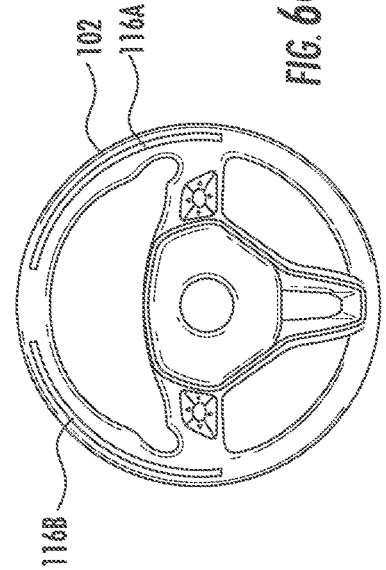
FIG. 6D is a plan view of an exemplary steering grip.

In an exemplary implementation, the steering apparatus 100 can include a single PCB 116 or multiple PCBs 116 located along the steering grip 102. For example, as illustrated in FIG. 6A, the steering grip 102 may include a single PCB 116 spanning the entire perimeter of the steering grip 102 thereby providing a 360° illumination system. In an alternate implementation illustrated in FIG. 6B, the steering grip 102 may include a single PCB 116 along the upper half of the perimeter defined by the steering grip 102. In a further implementations illustrated in FIGS. 6C-D, the steering grip 102 may include multiple PCBs 116. Because the steering apparatus 100, and in particular, the steering grip 102, is constructed to withstand substantial loading in the event of a crash, a steering grip 102 including multiple PCBs can provide for less likelihood that a PCB 116 will break upon impact and/or airbag deployment. Moreover, by locating multiple PCBs 116 along the diameter of the steering grip 102, and in particular along the upper half of the steering grip rim 102, helps to reduce the probability that a PCB 116 will break under a load at the 12 o'clock position on the rim of the steering wheel grip 102. As illustrated in FIG. 6C, the steering grip 102 may include multiple PCBs 116, including, for example, PCB 116A may be located on a right portion of the steering grip 102 diameter and PCB 116B may be located on a left portion of the steering grip diameter. In another implementation illustrated in FIG. 6D, the steering grip 102 may include three PCBs 116. PCB 116A may be located on a right portion of the steering grip 102, PCB 116B on a left portion of the steering grip, and PCB 116C on a top center portion of the steering grip 102, between PCBs 116A and 116B. In a further implementation, not shown, the steering grip 102 may include a PCB 116 located on a lower portion of the steering grip 102. Any number of locations and quantities of PCB 116 are considered within the disclosed implementation.

In an exemplary implementation, the PCB 116 includes a single zone or multiple zones for directing operation of the light element 104. For example, in an exemplary implementation, the PCB 116 may include one zone for controlling operation of the light element 104. The PCB 116 may control the light element 104 based on instructions provided to the corresponding zone of the PCB 116. The light element 104 may include a single light source, such as one LED, or it may include multiple light sources, i.e., multiple LEDs. In an exemplary implementation, the PCB 116 can provide separate instructions to each of the individual LEDs within the same zone.

In an alternate implementation, the PCB 116 can include multiple zones, for example, two or more zones, each associated with a different light element 104 or group of light elements 104. Each zone can be configured to provide separate operating instructions to their respective light elements 104. In an exemplary implementation, the LEDs may be arranged into groups and each group of LEDs assigned a zone on the PCB 116. For example, the PCB 116 may include 36 LED-style light elements 104. The exemplary PCB 116 may be divided into four zones, each zone associated with 9 LEDs. The PCB 116 can control operation of the LEDs in each of the four zones separately based on the instructions provided by the respective zones.

In an alternate implementation, the PCB 116 can include a number of zones corresponding to the number of light elements 104 present on the PCB 116, where each zone provides operation instructions to its corresponding light individual element 104. For example, an exemplary PCB 116 may include 36 LED-style light elements 104 and 36 zones corresponding to each of the 36 LEDs. The PCB can individually control operation of each of the 36 LEDs based on instructions provided to each of the corresponding 36 zones.

In an exemplary implementation, the steering apparatus 100 may include a processor connected in communication with the PCB 116. The processor may be configured to direct operation of the light element 104. The processor can be associated with the steering apparatus 100. In an exemplary implementation, the processor may be located on or proximate the PCB 116 of the steering grip 102. In an alternative implementation, the processor may be located on or otherwise associated with the electronic control unit of the vehicle. In a further implementation, the processor may be located on or otherwise associated with an other vehicle system. Where the processor is associated with a system other than the steering apparatus 100 and/or the steering grip 102, wired and/or wireless communication lines (i.e., data and/or power wires, radio frequency, wi-fi, Bluetooth, etc.) may be provided from the alternate system to the light element 104. For example, the light element 104 and/or the PCB 116 may be connected to the vehicle's electronic control unit (ECU) by a wire run from the ECU unit to the light element 104/PCB 116. In a further example, particular zones on the PCB 116 may communicate with a processor associated with a system other than the steering apparatus 100 and/or the steering grip 102, and communication lines (i.e., data and/or power wires) may be provided from the alternate system to the zoned PCB 116.

In an exemplary implementation, the light element 104, PCB 116, and the processor are connected in communication with the vehicle by two wires where the first wire may provide a power source to the light element 104, PCB 116, and the processor and the second wire provides a data connection between the steering apparatus 100 and the vehicle. In a further example, the light element 104, PCB 116, and the processor may be connected in communication with the vehicle by two wires, one including multiple communication lines and the second wire including power source. For example, where the PCB 116 includes 6 zones, the first wire may include 6 communication lines for directing the operation of the corresponding zones, and the second wire may be a power source for providing power to the PCB 116. The light element 104, PCB 116, and the processor may, alternatively, be in communication with the vehicle at only a power source.

In an exemplary implementation, the processor may be configured to receive information from the vehicle. Information received from the vehicle may include, for example, GPS (global positioning system) information, navigation information, foreign object proximity information, vehicle performance information, general warning information, course information, positioning information available from on-board sensor, such as cameras, radar, LIDAR (light detection and ranging) systems, vehicle communication system information, and any other information relevant to the operation of the vehicle, the status of the user, and/or the functioning of the steering apparatus 100.

Navigation information may include, for example, a preparation for course change (e.g., lane recommendation in anticipation of pending course change), a navigation course change (e.g., instructions for following determined route and/or notification that the determined route has been recalculated), and a distance to course change (e.g., distance to turn). Foreign object proximity information may include, for example, the distance and direction to an identified foreign object, the size of a foreign object, and the relative speed and direction of the foreign object. Foreign object information can also include foreign individual proximity information. For example, vehicle systems can be used to detect an unauthorized person's presence in/on/proximate the vehicle (e.g., sensors within the vehicle can detect the touch, weight/pressure, etc. of unauthorized individual in/on/proximate the vehicle). Example sensors might include capacitive sensors, pressure sensors, conductivity/resistivity sensors, and weight sensors. Foreign individual proximity information may be utilized in conjunction with any vehicle security/alarm system.

Vehicle performance information may include, for example, on/off operation of the vehicle, battery life/status, fuel level, fuel efficiency, engine RPM, vehicle oversteer, vehicle understeer, turbocharger/supercharger boost pressure, an electrical vehicle (eV) status, stop and go vehicle mode, steering grip 102 straight-ahead position, vehicle lateral acceleration, autonomous vehicle driving state information, adaptive cruise control state information, keyless entry (e.g., confirmation approved key fob detected), and keyless ignition operation, traction control, electronic stability control, braking control (e.g., anti-lock braking system control/status), active handling mode, vehicle track/race/ competition mode. General vehicle warning information may include, for example, occupant restraint information, airbag status information, door or window open/ajar/closed, sunroof/moon roof open/ajar/closed, low tire pressure, vehicle audio system status (e.g., entertainment system, audio volume, equalizer display/function, speaker control (e.g., left, right, front, rear, etc.)), vehicle communication system status (e.g., incoming call, Bluetooth activated/connected, etc.), heating and air conditioning system (e.g., temperature, fan speed), other temperature control systems (e.g., heated/cooled steering wheel, headed/cooled seats, beverage coolers, oil heater, battery heater, transmission heater, etc.). Course information may include, for example, a measure of a course remaining (e.g., a racing lap time countdown as a binary clock, lap segments, time segments, etc.) and a measure of the course remaining/completed (e.g., quantity of racing laps).

Operation of the light element 104 may be directed in response to information received from the steering apparatus 100 and/or information received from the vehicle. The light element 104 may be used to provide information and warning signals to the driver of the vehicle. In a further implementation, the light element 104 may be used to provide an aesthetically pleasing/decorative effect. For example, the light element 104 may be used at vehicle start up to provide a decorative effect in addition to providing an indication to the driver of the vehicle's operation status.

Directing illumination of the light element 104 may include, for example, the on/off state of the light element 104, intensity, design/pattern, on/off illumination cycle, color, or any other feature of the light element that can be controlled or otherwise manipulated. In an exemplary implementation, the on/off status of the light element 104 can be controlled. For example, in an implementation including multiple light elements 104, the quantity of light elements 104 illuminated at a given time can be used to indicate the magnitude and/or scale of the warning or event, the greater the number illuminated the greater the threat and/or importance of the warning/event. Similar to quantity, the intensity of the light elements 104 can be used to indicate the magnitude and/or scale of the warning or event, the greater the light intensity the greater the threat and/or importance of the warning/event. The actual design/pattern can be used to convey a particular message to the driver (e.g., illuminated symbols, shapes, text, icons, etc.). Likewise, the design/pattern of illumination can be used to indicate the magnitude/scale of the warning or event. The on/off illumination cycle or frequency of illumination of the light element 104 can also be controlled to create a flashing or strobe-like effect. For example, a high frequency on/off illumination cycle may be used to indicate an important and/or time sensitive event to the driver such as an impact or collision warning. In a further example, when the light element 104 comprises an IR illuminator, a strobed/flashing light signal may be used to illuminate the driver's eyes for use in camera-based driver monitoring systems. The operation of the exemplary IR illuminator-type light element 104 may be timed in communication with a camera, or other sensing device, and a processor to capture an image of the driver's eyes. Moreover, the use of IR LEDs can be used to mitigate light reflection when the driver is wearing eye glasses.

The selection of a light element 104 for illumination at a certain position can also be used to indicate the relative position of the warning or event. For example, if an impact or collision warning is anticipated at the front driver's side section of the car, the light element 104 at a corresponding position on the steering grip 102 (i.e., upper left quadrant) may be illuminated. Similarly, the on/off illumination cycle may be used to create a motion effect. The perceived direction of the light pattern can be used to indicate the relative direction of warning. For example, an on/off illumination pattern starting from the center of the steering grip 102 and progressing toward the left side of the grip 102 may create an illuminated wave-like effect toward the left that can be used to indicate a warning/event associated with the left side of the vehicle or an indication to the driver of a pending course change in a navigational setting.

In an exemplary steering apparatus 100, a pattern of illumination of the light element 104 can also be controlled. For example, in an implementation including multiple light elements 104, the light elements 104 may be sized and located such that a shape or pattern may be created by illuminating particular light elements 104. In an exemplary implementation, the color of the light element 104 can also be controlled. The color of the light element may be used to indicate the severity or a threat level associated with a particular event. For example, colors such as red, yellow, and green can be used to indicate the escalating severity/threat associated with a particular event, red indicating severe, yellow a moderately severe/warning, and green little or no threat. For example, if the vehicle senses an impact or collision warning or if the vehicle is traveling faster than allowable speed limit, the color of the light elements 104 may progress from green to yellow to red as the severity of the warning/event escalates. In an alternate implementation, controlling the color of the light element 104 may be used to indicate a vehicle status or provide general driver indications. For example, colors such as blue or white may be used to indicate general vehicle status and driver indication.

The following illumination combinations are provided as exemplary and should not be considered limiting on the disclosed invention. Additional and alternative light element 104 locations and configurations are contemplated. Various combinations of light element 104 operation may be utilized to indicate the relative position and/or threat levels associated with a particular warning/event, as well as provide general status information to the driver.

Figure 7:
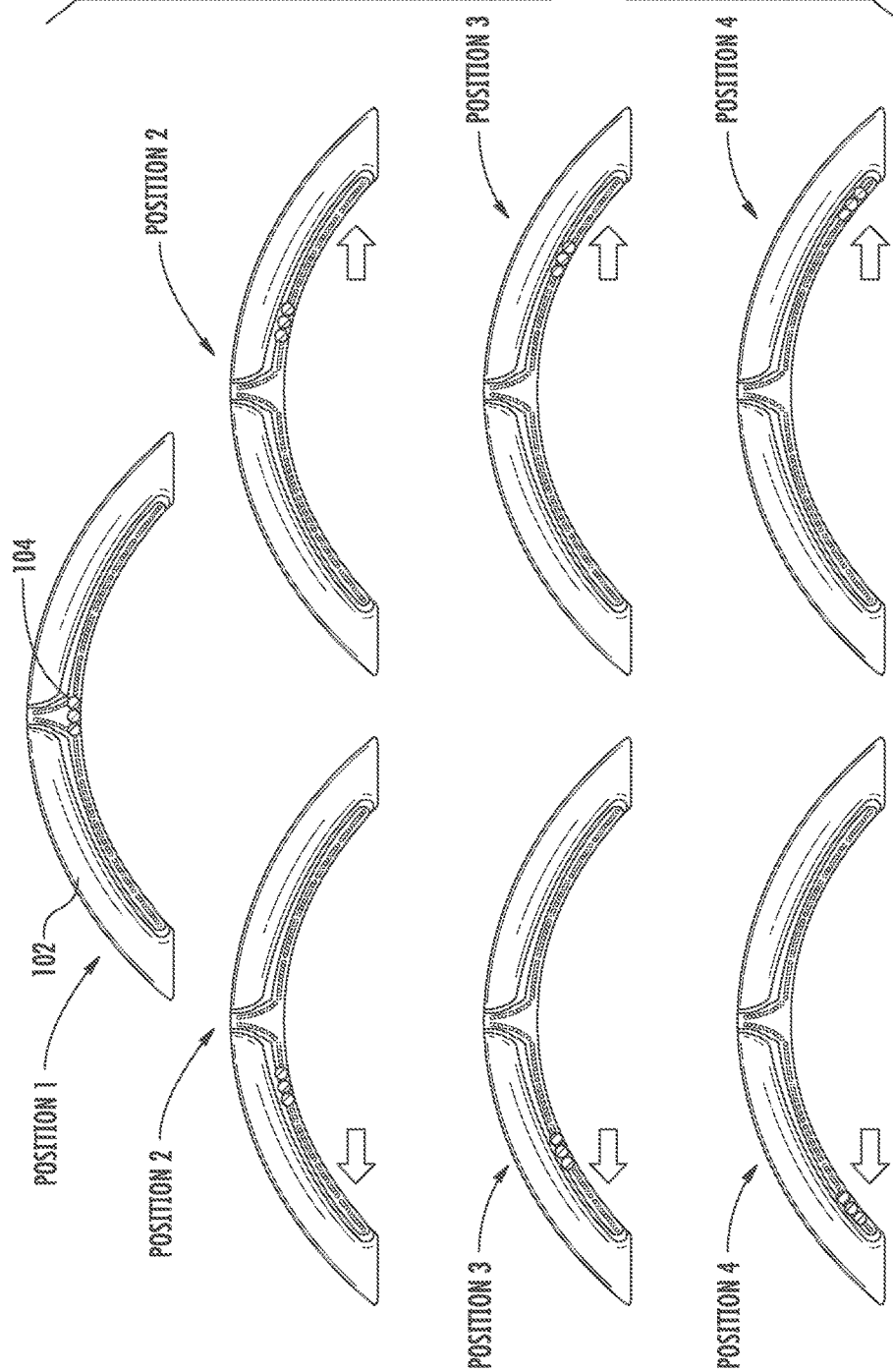
FIG. 7 is a partial plan view of an exemplary steering grip and light element.

In an exemplary implementation, operation of the light element 104 may be directed in response to information received from the vehicle and/or information received from the steering apparatus 100. Information received from the vehicle can include, for example, GPS information, on-board sensor information, camera information, communication system information, and lane position information. The operation of the light element 104 may be directed to provide the driver with a lane departure warning. An exemplary lane departure warning indication wherein the light position indicates the direction of the threat event is illustrated in FIG. 7. When the vehicle is in a straight ahead orientation, the illuminated light element 104 may be centered on the steering grip 102 (Position 1). In response to the received information, as the vehicle moves to the left side of the lane of travel, the light elements 104 on the left side of the steering grip 102 are illuminated (Position 2). As the vehicle moves progressively further toward the left side of the lane of travel, light elements 104 further along the left side of the steering grip 102 are illuminated (Position 3 and Position 4). Alternatively, as the vehicle moves to the right side of the lane of travel, the light elements 104 on right side of the steering grip are illuminated (Position 2). As the vehicle moves progressively further toward the right side of the lane of travel, the light elements 104 further along the right side of the steering grip are illuminated (Position 3 and Position 4). In an exemplary implementation, the time to lane cross may be used to determine the threat level associated with the vehicles direction of travel.

Figure 8:
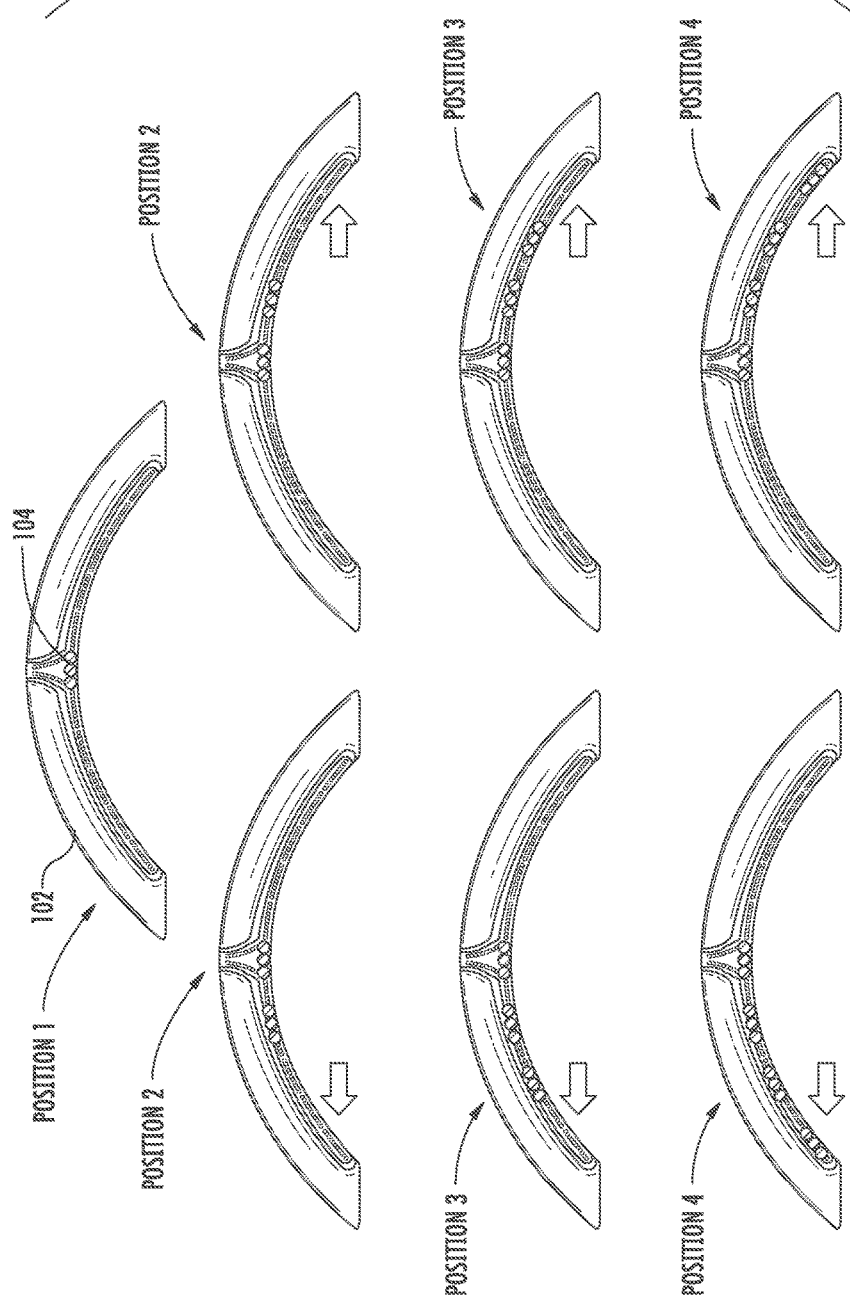
FIG. 8 is a partial plan view of an exemplary steering grip and light element.

As outlined above, both the quantity and position of lights may be used to indicate the relative position and/or threat level associated with the warning/event. An exemplary lane departure warning indication wherein the quantity and position of illuminated light elements 104 are used to indicate the relative position and/or threat level of the warning or event is provided in FIG. 8. When the vehicle is in a straight ahead orientation, the illuminated light element 104 may be centered on the steering grip 102 (Position 1). In response to information received from the vehicle (e.g., GPS information, on-board sensor information, camera information, communication system information, and lane position information), as the vehicle moves to the left side of the lane of travel, additional light elements 104 on the left side of the steering grip 102 are illuminated (Position 2). As the vehicle moves progressively further toward the left side of the lane of travel, additional light elements 104 further along the left side of the steering grip 102 are illuminated (Position 3 and Position 4). Alternatively, as the vehicle moves to the right side of the lane of travel, additional light elements 104 on right side of the steering grip are illuminated (Position 2). As the vehicle moves progressively further toward the right side of the lane of travel, additional light elements 104 further along the right side of the steering grip are illuminated (Position 3 and Position 4). In an exemplary implementation, the time to lane cross may be used to determine the threat level associated with the vehicles direction of travel and the rate and quantity of the illumination of the additional light elements 104 are illuminated.

Figure 9:
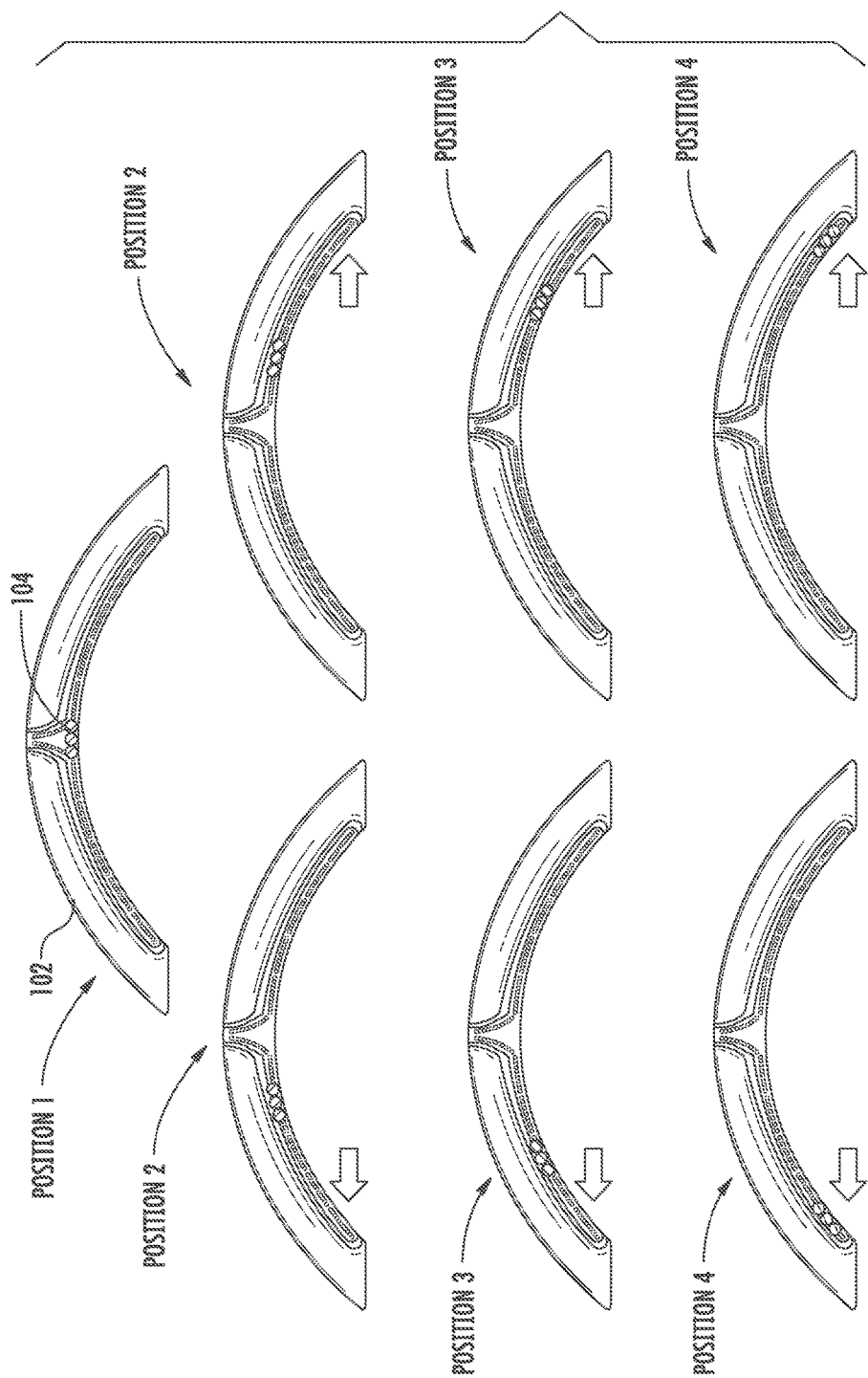
FIG. 9 is a partial plan view of an exemplary steering grip and light element.

As outlined above, the color of the illuminated light elements may be used to indicate the relative position and threat level associated with the warning/event. An exemplary lane departure warning indication wherein the color and position of the illuminated light elements 104 are used to indicate the relative position and/or threat level of the warning or event is provided in FIG. 9. When the vehicle is in a straight ahead orientation, the illuminated light element 104 may be centered on the steering grip 102. The illuminated light element may be provided in a color that indicates no threat/warning associated with the given lane position. As illustrated in FIG. 9, the illuminated light element may be green when the steering grip 102 is a centered/straight ahead position (Position 1). In response to information received from the vehicle (e.g., GPS information, on-board sensor information, camera information, communication system information, and lane position information), as the vehicle moves to the left or right side of the lane of travel, the light elements 104 on the left side of the steering grip 102 or the light elements 104 on the right side of the steering grip 102 are illuminated. An initial indication of lane departure may be provided by green illuminated light elements 104 (Position 2). As the vehicle moves progressively further toward the left or right side of the lane of travel, light elements 104 further along the left/right side of the steering grip 102 are illuminated. These light elements may indicate a moderate threat/warning and may be provided, for example, by yellow illuminated light elements 104 (Position 3). As the vehicle moves progressively further toward the left or right side of the lane of travel, the light elements 104 further along the left/right side of the steering grip 102 are illuminated. These light elements may indicate a severe and/or immediate threat and may be provided, for example, by red illuminated light elements 104 (Position 4). In an exemplary implementation, the time to lane cross may be used to determine the threat level associated with the vehicles direction of travel.

Figure 10:
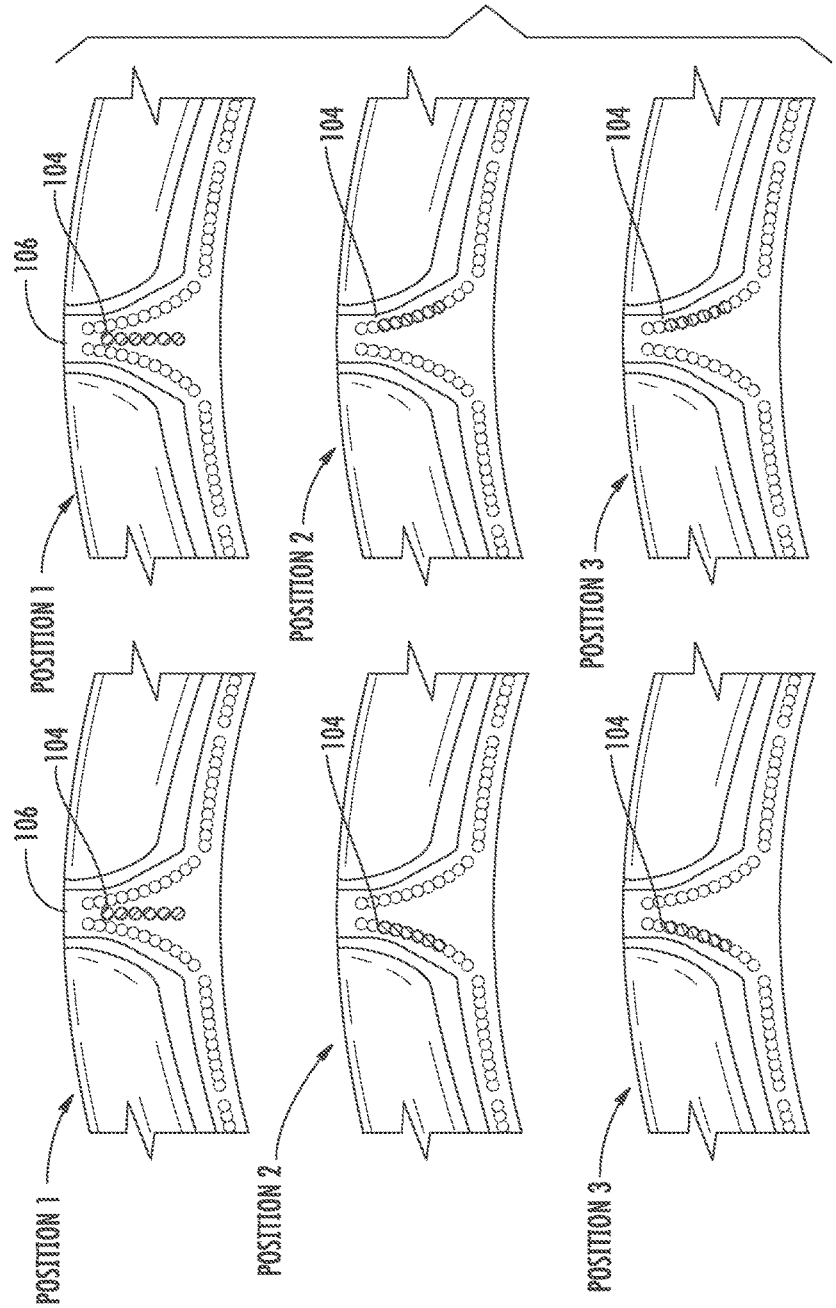
FIG. 10 is a partial plan view of an exemplary steering grip and light element.

In a further implementation, the vertical element 106 can include be used to indicate the relative position and threat level associated with a particular warning/event. As illustrated in FIG. 10, the vertical element 106 may include a plurality of light elements 104. When the vehicle is in a straight ahead orientation, the light elements 104 centered in the vertical element 106 may be illuminated (Position 1). Because the relative threat/warning level in the straight ahead position is minimal, the illuminated light element 104 in Position 1 may be green. In response to information received from the vehicle (e.g., GPS information, on-board sensor information, camera information, communication system information, and lane position information), as the vehicle moves to the left or right side of the lane of travel, the light elements 104 on the left or right side, respectively, of the vertical element 106 are illuminated. For example, an initial indication that the vehicle is tending toward the left side of the lane of travel may be provided by illumination of the light elements 104 on the left side of the vertical element (Position 2). These light elements 104 may indicate a moderate threat/warning and may be provided, for example, by yellow illuminated light elements 104. As the vehicle moves progressively further toward the left or right side of the lane of travel, the light elements 104 may change colors from yellow to red, indicating that the threat level associated with the lane departure has escalated from moderate to severe and/or immediate.

Figure 11:
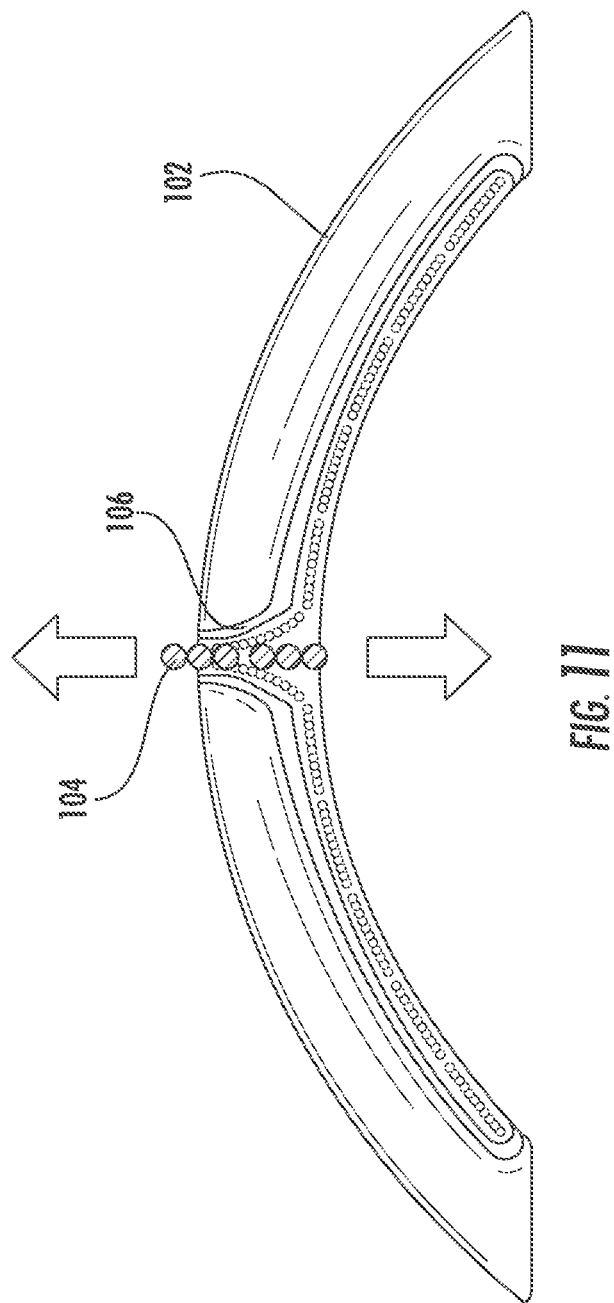
FIG. 11 is a partial plan view of an exemplary steering grip and light element.

In an exemplary implementation, the vertical element 106 can be used to indicate the relative position and/or threat level associated an impact/collision warning. As illustrated in FIG. 11, the vertical element 106 may include a plurality of light elements 104. The operation of the light elements 104 may be directed in response to foreign object proximity information received from the vehicle. Illumination of the light elements 104 may indicate the presence of a foreign object/individual within a predetermined distance of the vehicle and/or a distance to the foreign object/individual. In response to the object data, the light elements 104 located on the steering grip 102 illuminate. For example, as the object is approaching the light elements 104 may illuminate in a wave pattern suggesting the direction of the object and/or the proximity of the object to the vehicle. As a further example, the light elements 104 may illuminate in an illumination pattern, at a greater on/off frequency, at a particular quantity of light elements 104, with greater intensity, and/or varying colors as the direction and/or the proximity of the object to the vehicle change.

Figure 12:
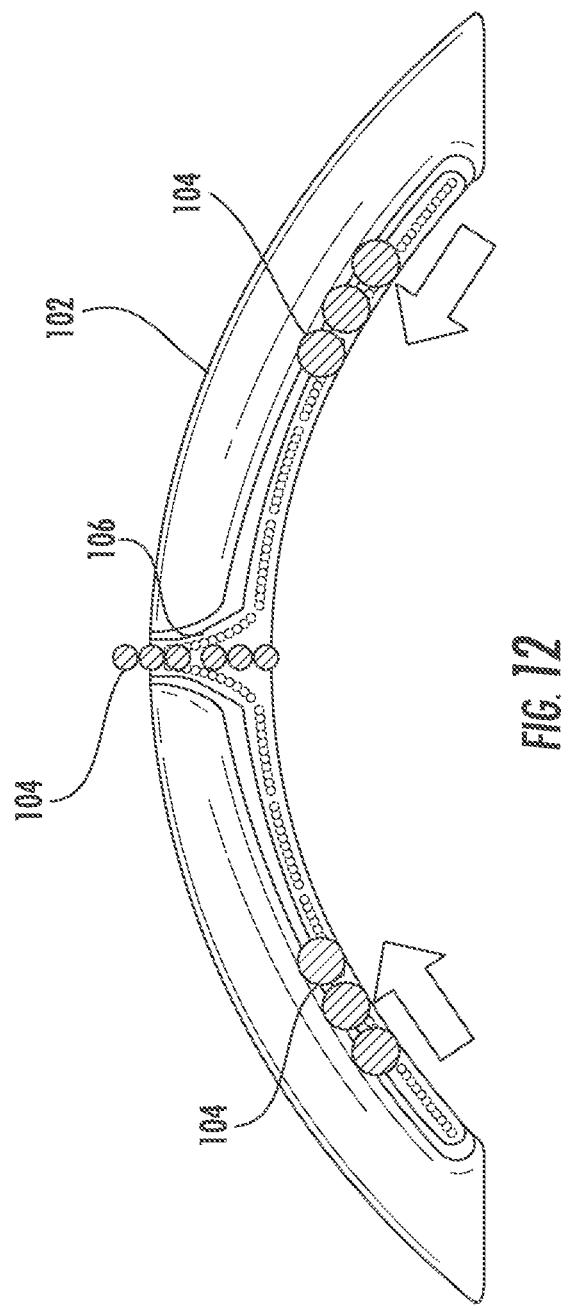
FIG. 12 is a partial plan view of an exemplary steering grip and light element.

In an exemplary implementation, the vertical light element 106 can be used in conjunction with the light elements 104 position on the side of the steering grip 102. For example, as illustrated in FIG. 12, the light elements 104 can be used to guide the driver in operation of the vehicle. An exemplary steering apparatus 100 can be used guide a driver into a parking space. In the exemplary implementation, the light elements 104 can be used to direct the driver to aim the vehicle in a particular manner. Operation of the light elements 104 can include, for example, on/off illumination, illumination pattern, on/off cycling, intensity, and color. It is contemplated that operation of the light elements 104 of the vertical element 106 may be independent from the operation of the light elements 104 included along the diameter of the steering grip 102. For example, the light elements 104 of the vertical element 106 may be used to indicate proximity to a foreign object (e.g., parked car) while the light elements 104 included along the diameter of the steering grip 102 as used to provide directional and navigation information to the user. As illustrated in FIG. 12, the light elements 104 included along the diameter of the steering grip 102 can illuminate at a location and frequency to suggest the direction of travel of the vehicle. In an alternate implementation, the operation of the light elements 104 of the vertical element 106 may be in cooperation with the light elements 104 included along the diameter of the steering grip 102. For example, both the vertical and radial light elements 104 may be used to provide navigation information to suggest the direction of travel of the vehicle.

In a further implementation, the vertical and/or radial light elements 104 may be used to indicate a difference between the posted speed limit and the actual speed of the vehicle. For example, the steering apparatus 100 may receive information including GPS information and vehicle performance information. The GPS information may include information associated with a posted speed limit at the vehicle's current location. The vehicle performance information may include information associated with the actual speed of the vehicle. The vehicle and/or the steering apparatus 100 can determine that the vehicle is exceeding the posted speed limit and the operation of the light elements 104 may be directed to indicate a threat/warning associated with speed of the vehicle.

In another implementation, vertical and/or radial light elements 104 may be used to indicate the electronic stability control, braking control (e.g., anti-lock braking system control/status), active handling mode, and/or vehicle track/race/competition mode information. For example, the light elements 104 can be used to convey information associated with RPM and/or braking threshold information. Varying patterns, colors, intensity, etc. of the light elements 104 can be used to indicate the intensity of the particular feature/vehicle function (e.g., increased intensity related to increased RPM). Similarly, multiple types of performance information can be simultaneously displayed using the light elements 104. In an example steering grip 102, light elements 104 can display both RPM information and gravitational-force information.

In an exemplary implementation, the steering apparatus may include a sensor (not shown) located on the steering grip 102. The sensor may detect the driver input and/or touch on the steering grip. Exemplary sensors include, for example, capacitive sensors, pressure sensors, and conductivity/resistivity sensors. The sensor may be in communication with the PCB 116 and/or the processor. In an further implementation, the driver's input may be transmitted to the electronic control unit of the vehicle. In an exemplary implementation, the steering apparatus 100 may be configured to receive autonomous driving state information and/or adaptive cruise control information from the vehicle. The autonomous driving state information may indicate that the vehicle is operating autonomously and not under human control. The adaptive cruise control information may include whether the adaptive cruise control feature is engaged. Adaptive cruise control maintains a set distance between the car immediately in front of the driver's vehicle and/or stops the vehicle completely when an emergency situation is identified. In some autonomous driving state and the adaptive cruise control settings, some vehicles direct acceleration/braking of the vehicle in addition to controlling steering (e.g., to keep the vehicle within the lane when braking). For the lane keeping feature of the adaptive cruise control it is essential that the driver be holding the steering grip 103 or the braking feature will not engage. Similarly, in some situations the autonomous driving state of the vehicle may disengage (e.g., stop and go traffic), in these situations it is also essential that the driver holding the steering grip 103. Therefore, using on the received information about the state of the vehicle and/or sensor information confirming the driver's input/contact with the steering apparatus 100, operation of the light element 104 may be directed to indicate that the vehicle is not operating under human control or that human operation of the vehicle is necessary and the driver is required to engage the steering grip 102.

In an alternative implementation (not shown), the steering apparatus 100 also includes an acoustic display and/or a haptic display devices that work exclusively from or in conjunction with the light element 104. The haptic displays can include, for example, vibrators arranged on the steering grip 102/steering apparatus 100 such that vibration of the steering grip 102 is felt by the driver in every grip position. The steering apparatus 100 may be configured to direct operation of the vibrator in response to information received from the vehicle, information received from the steering grip 102, and/or input information received from the driver at the steering grip 102. Operation of the vibrator can include, for example manipulating the frequency, intensity, and location of the produced vibration. The frequency, intensity, and/or location of the produced vibration can coordinate with the frequency, intensity and/or location of the light element 104.

It should be appreciated that the logical operations described herein with respect to the various figures may be implemented (1) as a sequence of computer implemented acts or program modules (i.e., software) running on a computing device, (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 13:
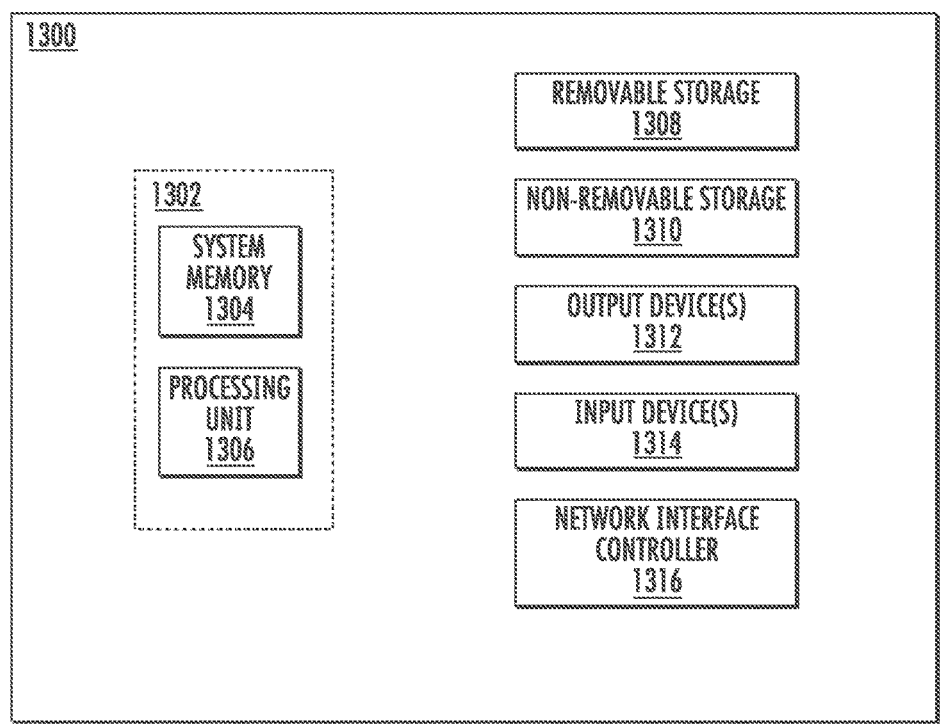
FIG. 13 is a schematic computer system architecture of an exemplary steering apparatus.

When the logical operations described herein are implemented in software, the process may execute on any type of computing architecture or platform. For example, the functions of the PCB, processor, control circuitry, and vehicle electronics control unit, as described above, may be implemented on any type of computing architecture or platform. An exemplary implementation illustrated in FIG. 13 provides an example computing device upon which embodiments of the invention may be implemented. The computing device 1300 may include a bus or other communication mechanism for communicating information among various components of the computing device 1300. In its most basic configuration, computing device 1300 typically includes at least one processing unit 1306 and system memory 1304. Depending on the exact configuration and type of computing device, system memory 1304 may be volatile (such as random access memory (RAM)), non-volatile (such as read-only memory (ROM), flash memory, etc.), or some combination of the two. This most basic configuration is illustrated in FIG. 13 by dashed line 1302. The processing unit 1306 may be a standard programmable processor that performs arithmetic and logic operations necessary for operation of the computing device 1300.

Computing device 1300 may have additional features/functionality. For example, computing device 1300 may include additional storage such as removable storage 1308 and non-removable storage 1310 including, but not limited to, magnetic or optical disks or tapes. Computing device 1300 may also contain network connection(s) 1316 that allow the device to communicate with other devices. Computing device 1300 may also have input device(s) 1314 such as a keyboard, mouse, touch screen, etc. Output device(s) 1312 such as a display, speakers, printer, etc. may also be included. The additional devices may be connected to the bus in order to facilitate communication of data among the components of the computing device 1300. All these devices are well known in the art and need not be discussed at length here.

The processing unit 1306 may be configured to execute program code encoded in tangible, computer-readable media. Computer-readable media refers to any media that is capable of providing data that causes the computing device 1300 (i.e., a machine) to operate in a particular fashion. Various computer-readable media may be utilized to provide instructions to the processing unit 1306 for execution. Common forms of computer-readable media include, for example, magnetic media, optical media, physical media, memory chips or cartridges, a carrier wave, or any other medium from which a computer can read. Example computer-readable media may include, but is not limited to, volatile media, non-volatile media and transmission media. Volatile and non-volatile media may be implemented in any method or technology for storage of information such as computer readable instructions, data structures, program modules or other data and common forms are discussed in detail below. Transmission media may include coaxial cables, copper wires and/or fiber optic cables, as well as acoustic or light waves, such as those generated during radio-wave and infra-red data communication. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 1306 may execute program code stored in the system memory 1304. For example, the bus may carry data to the system memory 1304, from which the processing unit 1306 receives and executes instructions. The data received by the system memory 1304 may optionally be stored on the removable storage 1308 or the non-removable storage 1310 before or after execution by the processing unit 1306.

Computing device 1300 typically includes a variety of computer-readable media. Computer-readable media can be any available media that can be accessed by device 1300 and includes both volatile and non-volatile media, removable and non-removable media. Computer storage media include volatile and non-volatile, and removable and non-removable media implemented in any method or technology for storage of information such as computer readable instructions, data structures, program modules or other data. System memory 1304, removable storage 1308, and non-removable storage 510 are all examples of computer storage media. Computer storage media include, but are not limited to, RAM, ROM, electrically erasable program read-only memory (EE-PROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1300. Any such computer storage media may be part of computing device 1300.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Figure 14:
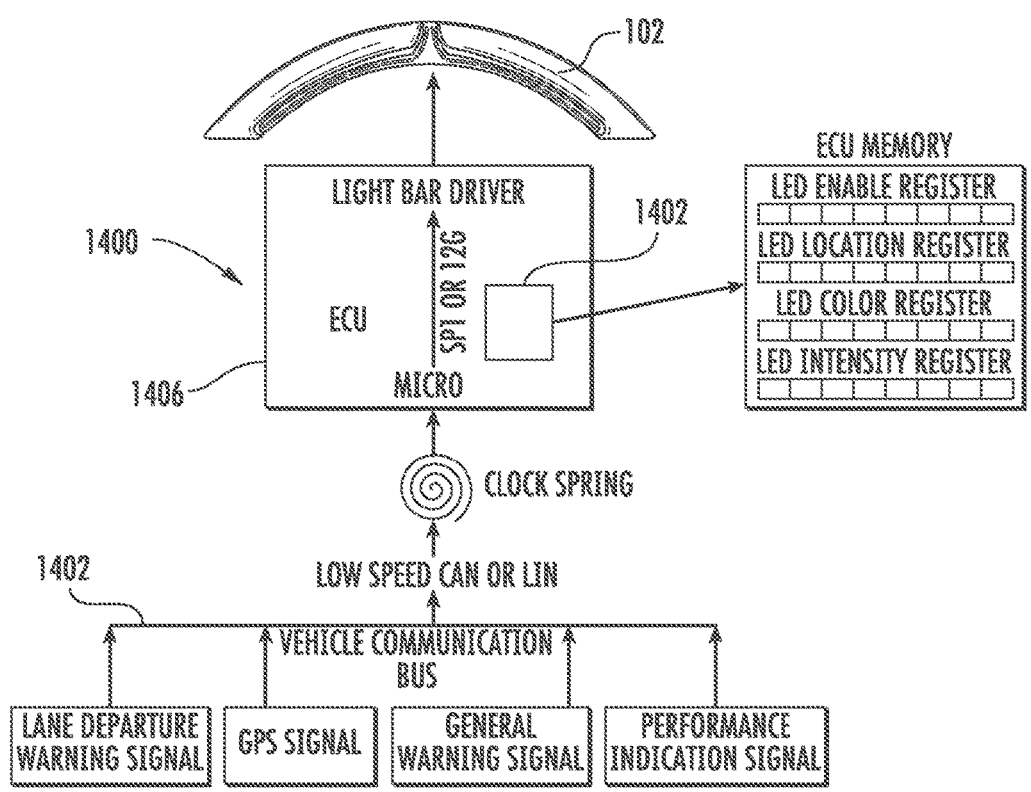
FIG. 14 is a schematic computer system architecture of an exemplary steering apparatus.

FIG. 14 provides schematic illustration of an exemplary computer architecture upon which the invention may be implemented. The computing device 1400 may include a processing unit 1406 and a memory 1404. The memory 1404 may include various registers. Exemplary registers may include an LED enable register, an LED location register, and LED color register, and an LED intensity register. The computing device 1400 may include a light element driver for providing illumination instructions to the light element 104.

The computing device 1400 may include a bus 1402 or other communication mechanism for communicating information among various components of the computing device 1400. In an exemplary implementation, the bus 1402 may provide a communication link between the computing device 1400 and the vehicle. In an alternate implementation, the bus 1402 may provide a communication link between the computing device 1400 and various vehicle components. Information transmitted by the bus 1402 may include, for example, lane departure warning signal information, GPS signal information, general warning signal information, and vehicle performance indication signal information.

An exemplary implementation may include a clock spring 1408 associated with the processing unit 1406 and the communication bus 1402. The clock spring 1408 may provide an electrical connection/communication link between when the processing unit 1406 is located proximate the steering grip 102/steering apparatus 100. An exemplary clock spring 1408 includes a rotary-type electrical connection that permits rotation of the steering grip 102 while maintaining an electrical connection with the bus 1402. For example, the clock spring 1408 may include a static element, generally mounted to the steering column, and a rotating element, generally mounted to the steering grip 102.

While the foregoing description and drawings represent the preferred implementation of the present invention, it will be understood that various additions, modifications, combinations and/or substitutions may be made therein without departing from the spirit and scope of the present invention as defined in the accompanying claims. In particular, it will be clear to those skilled in the art that the present invention may be embodied in other specific forms, structures, arrangements, proportions, and with other elements, materials, and components, without departing from the spirit or essential characteristics thereof. One skilled in the art will appreciate that the invention may be used with many modifications of structure, arrangement, proportions, materials, and components and otherwise, used in the practice of the invention, which are particularly adapted to specific environments and operative requirements without departing from the principles of the present invention. In addition, features described herein may be used singularly or in combination with other features. The presently disclosed implementations are, therefore, to be considered in all respects as illustrative and not restrictive, the scope of the invention being indicated by the appended claims and not limited to the foregoing description.

It will be appreciated by those skilled in the art that changes could be made to the implementations described above without departing from the broad inventive concept thereof. It is understood, therefore, that this invention is not limited to the particular implementations disclosed, but it is intended to cover modifications within the spirit and scope of the present invention, as defined by the following claims.

What is claimed is:

1. A light bar system for a steering wheel comprising:
   at least one light source disposed adjacent a portion of an armature of the steering wheel; and
   a light diffusing layer having an inner surface and an outer surface,
   wherein light is diffused as it passes through the light diffusing layer from the inner surface to the outer surface, the inner surface of the light diffusing layer is disposed adjacent the light source, and the light exiting the outer surface appears as a continuous stream of light across the outer surface of the light diffusing layer.

2. The light bar system of claim 1, further comprising:
   an outer lens, an outer surface of the outer lens facing a driver and an inner surface of the outer lens facing the outer surface of the light diffusing layer.

3. The light bar system of claim 2, wherein the light diffusing layer diffuses ambient light that enters the outer lens and is reflected from a surface of the light bar system prior to the reflected ambient light being emitted through the outer lens toward the driver.

4. The light bar system of claim 1, wherein a lens is disposed between the light source and the diffusing layer to guide the light emitted from the light source towards a driver.

5. The light bar system of claim 2, wherein the light diffusing layer is a light diffusing film,
   wherein the system further comprises an additional light altering film disposed between the at least one light source and the outer lens.

6. The light bar system of claim 5, wherein the additional light altering film includes at least one of a brightness enhancing film and a second light diffusing film.

7. The light bar system of claim 6, wherein the additional light altering film is a brightness enhancing film, and the brightness enhancing film is disposed between the light source and the light diffusing layer.

8. The light bar system of claim 7, further comprising a lens to guide the light emitted from the light source towards the driver, the lens is disposed adjacent the light source such that the lens is between the light source and the outer lens,
   wherein the brightness enhancing film is disposed adjacent the lens, such that the brightness enhancing film is disposed between the lens and the diffusing film.

9. A light bar system for a steering wheel comprising:
   at least one light source disposed adjacent a portion of an armature of the steering wheel; and
   a light diffusing layer having an inner surface and an outer surface,
   wherein light is diffused as it passes through the light diffusing layer from the inner surface to the outer surface, the inner surface of the light diffusing layer is spaced apart from the light source such that an air gap is defined between the inner surface and the light source, and the light exiting the outer surface appears as a continuous stream of light across the outer surface of the light diffusing layer.

10. The light bar system of claim 9, further comprising:
    an outer lens, an outer surface of the outer lens facing a driver and an inner surface of the outer lens facing the outer surface of the light diffusing layer.

11. The light bar system of claim 10, wherein the light diffusing layer diffuses ambient light that enters the outer lens and is reflected from a surface of the light bar system prior to the reflected ambient light being emitted through the outer lens toward the driver.

12. The light bar system of claim 9, wherein the light diffusing layer is a light diffusing film, and the system further comprises an additional light altering film disposed between the at least one light source and the outer lens.

13. The light bar system of claim 12, wherein the additional light altering film includes at least one of a brightness enhancing film and a second light diffusing film.

14. The light bar system of claim 13, wherein the additional light altering film is a brightness enhancing film,
    wherein the brightness enhancing film is disposed adjacent the light diffusing layer and spaced apart from the light source.

15. The light bar system of claim 14, further comprising:
    an outer lens, an outer surface of the outer lens facing a driver and an inner surface of the outer lens adjacent the outer surface of the light diffusing layer such that the light diffusing layer is between the brightness enhancing film and the outer lens.

16. The light bar system of claim 9, further comprising:
    a second light diffusing layer located adjacent the light source such that the air gap is defined between the light diffusing layer and the second light diffusing layer.

17. A light bar system for a steering wheel comprising:
    at least one light source disposed adjacent a portion of an armature of the steering wheel;
    a lens having an outer surface facing a driver and an inner surface facing the light source;
    wherein light is directed towards the driver as it passes through the lens from the inner surface to the outer surface, such that the light exiting the outer surface appears as a continuous stream of light across the outer surface of the lens.

18. The light bar system of claim 17, wherein the lens diffuses ambient light that enters the lens and is reflected from a surface of the light bar system prior to the reflected ambient light being emitted through the lens toward the driver.

19. The light bar system of claim 17, further comprising an inner lens located between the lens and the light source, where an outer surface of the inner lens faces the lens and an inner surface of the inner lens faces the light source.

20. The light bar system of claim 19, wherein at least one of the lens and the inner lens include at least one of a filler and a fiber to increase a brightness of the light output the lens.

* * * * *